A. B. WALLEM.
FEED WATER HEATER.
APPLICATION FILED MAY 1, 1918.
1,438,200.
Patented Dec. 12, 1922.
2 SHEETS—SHEET 2.
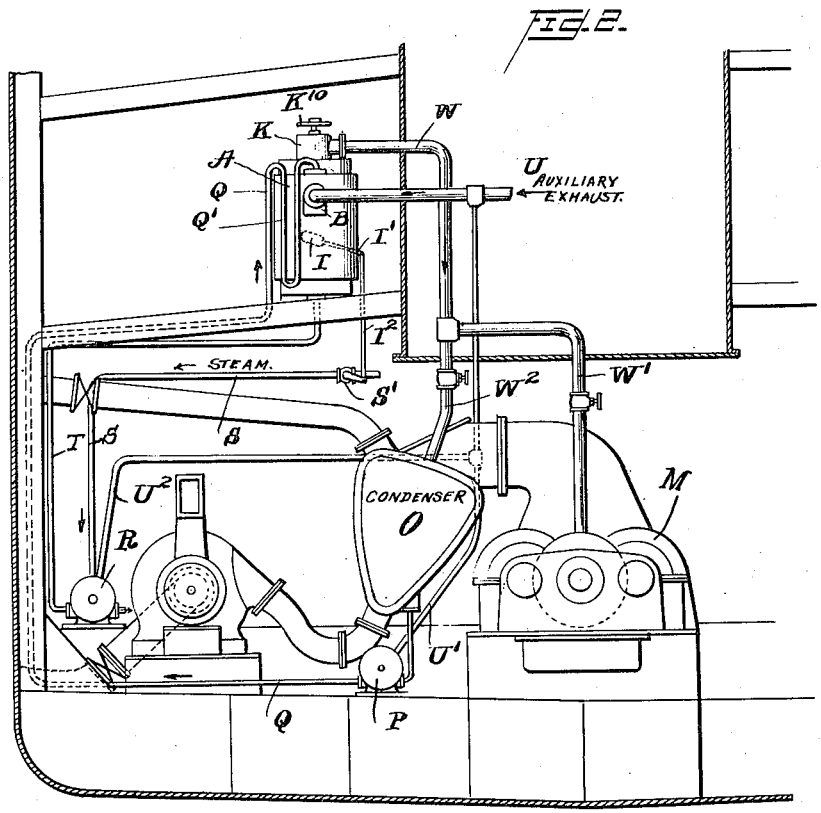
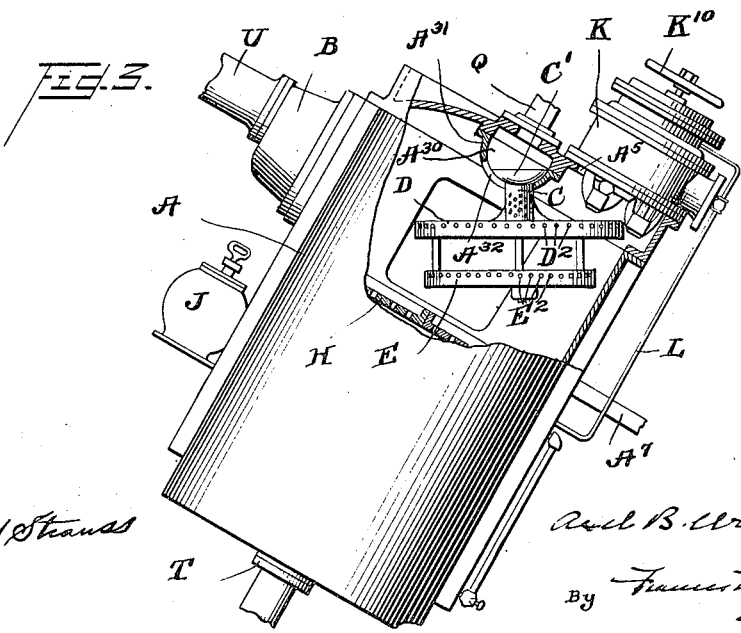

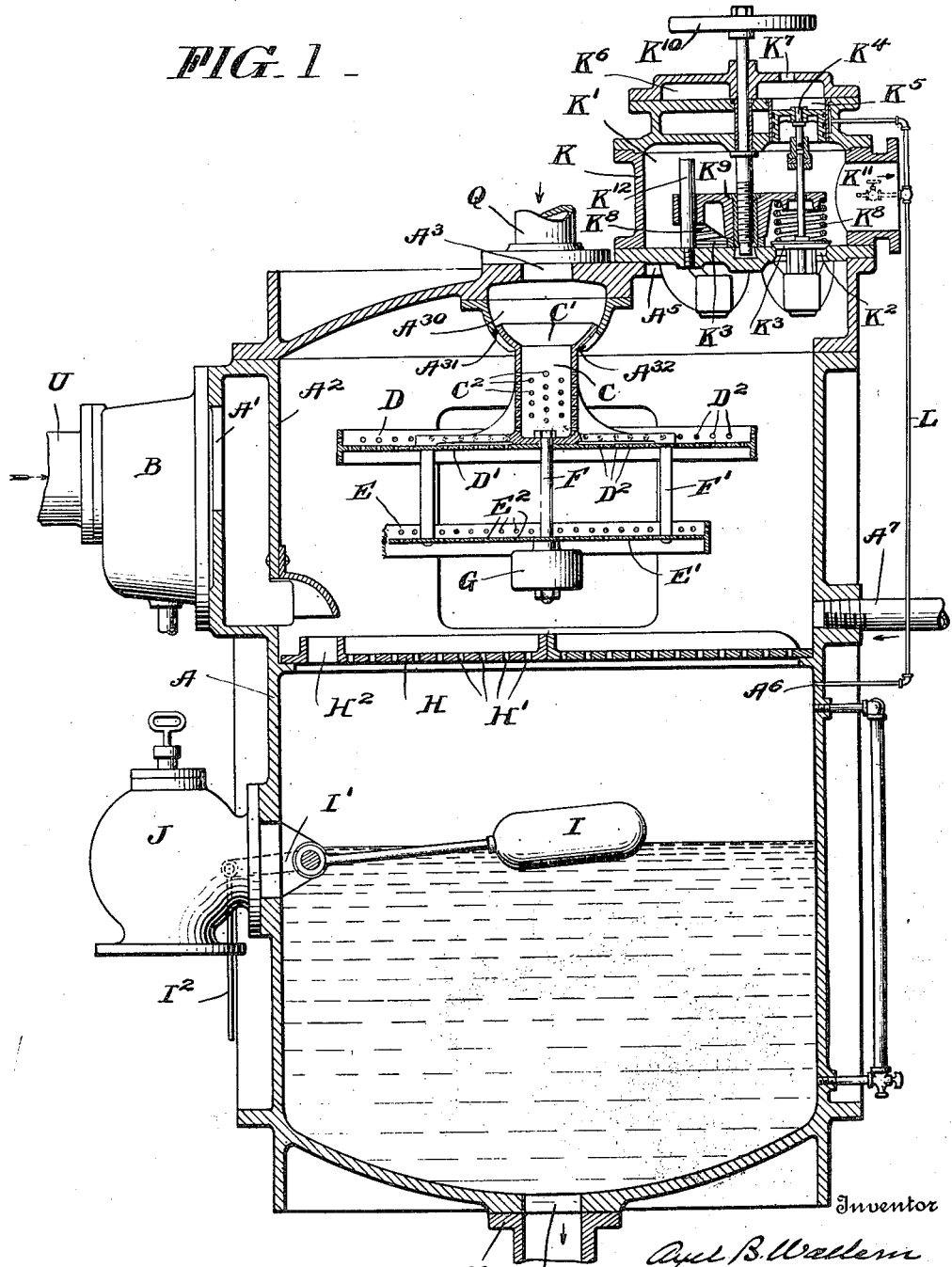

Patented Dec. 12, 1922.

1,438,200

UNITED STATES PATENT OFFICE.

AXEL B. WALLEM, OF CYNWYD, PENNSYLVANIA, ASSIGNOR, BY MESNE ASSIGNMENTS, TO H. S. B. W.-COCHRANE CORPORATION, OF PHILADELPHIA, PENNSYLVANIA, A CORPORATION OF PENNSYLVANIA.

FEED-WATER HEATER.

Application filed May 1, 1918. Serial No. 231,650.

*To all whom it may concern:*

Be it known that I, AXEL B. WALLEM, a citizen of the United States of America, residing at Cynwyd, in the county of Montgomery, State of Pennsylvania, have invented certain new and useful Improvements in Feed-Water Heaters, of which the following is a true and exact description, reference being had to the accompanying drawings, which form a part thereof.

My present invention has for its general or primary object to provide improved means for preheating boiler feed water in a marine power plant. A more specific object of my invention is to provide desirable means for the preheating of the boiler feed water on shipboard with exhaust steam by means of an open, as distinguished from a closed, feed water heater, and my invention consists in part in an open water heater of novel construction and especially devised for use on shipboard, and consists in part of the novel arrangement in which I connect an open feed water heater into a marine power plant.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of my invention.

Of the drawings:

Figure 1 is a sectional elevation of my improved open feed water heater;

Figure 2 is a diagrammatic representation of a portion of a marine power plant; and Figure 3 is a section taken similar to Fig. 1, but on a smaller scale and showing a portion of the apparatus of Fig. 1 with parts in relative positions different from those occupied by them in Fig. 1.

In the drawings A represents the housing or tank of an open feed water heater. As shown, the heater is formed with a steam inlet A' adjacent its upper end, and receiving steam from the outlet of a separator B which may be of usual construction. $A^2$ represents a shell or cover located in front of the inlet A' and adapted to prevent water splashing off the water spreader, hereinafter referred to, from passing through the steam inlet A'. At its upper end the housing A is provided with a water inlet $A^3$ which opens into a water inlet chamber $A^{30}$, the lower wall of which is formed by a cup-shaped member $A^{31}$, having a central aperture $A^{32}$ at its bottom. The inner surface of the hollow member $A^{31}$ at the margin of the aperture $A^{32}$ is concaved to form a spherical seat for the enlarged head C' of a member C which passes through, but does not fill the aperture $A^{32}$.

The member C forms part of a water spreader which also comprises horizontally extending tray or baffle members D and E. As shown, the member C is tubular or cup-shaped, with its enlarged head C' in the form of an out-turned rim or flange. A large number of small discharge orifices $C^2$ are formed in the wall of the member C to discharge the water, entering the member C through its open upper end, into the steam and water space of the heater beneath the chamber $A^{30}$. The baffle or tray member D is formed with a flange or rim at the periphery of a horizontal disc-like body portion D', and thus constitutes a shallow tray through the bottom of which a large number of comparatively small perforations $D^2$ are formed. Perforations $D^2$ are also formed through the portion of the peripheral rim above the tray bottom D'. The member E is similar to the member D though preferably its body portion E' is smaller than, and is overlapped at all points around its periphery by the body portion D' of the member D. Small ports $E^2$ are formed in the body portion E' and in the upper portion of the rim of the member E. As shown, the members D and E are spaced apart and mechanically connected to one another by posts F' and a bolt F. The latter passes through an aperture in the bottom wall of the member C and has its head within the latter and serves to rigidly secure together the members C, D and E. To make more positive the pendulum action of the water spreading device formed by the parts C, D and E occurring when the tank A is rocked as hereinafter explained, a weight G is shown as secured by the bolt F to the water spreader beneath the member E.

Located below the bottom of the water spreader and appreciably above the normal water level in the lower portion of the housing is a perforated partition or diaphragm H. As shown, the partition H is formed with a plurality of small water discharge apertures H', and a larger steam pressure equalizing aperture $H^2$ which is surrounded at the upper side of the partition by a flange. At the bottom of the housing is provided an outlet $A^4$ for the heated water, and J represents an overflow valve for limiting the height of water level in the heater. The valve J may be automatically operated in the usual manner by a float I which also operates a lever arm I' and a rod $I^2$ to thereby control a boiler feed pump as hereinafter explained.

The steam pressure in the heater is limited by an automatic back pressure and constant pressure valve K which automatically operates to permit uncondensed steam to escape from the heater when necessary to prevent an undue rise in pressure in the heater.

As shown, the valve mechanism K, which is of a known type, comprises a casing mounted on top of the tank A and closing an aperture $A^5$ in the wall of the latter. The chamber K' in the member K communicates with the interior of the heater tank A through a plurality of ports $K^2$ each of which is controlled by a corresponding valve disc $K^3$. Each valve disc $K^3$ is connected to a corresponding piston $K^4$ coaxial with the valve disc and working in an open ended piston chamber $K^5$.

The lower end of each chamber $K^5$ is open to the chamber K', and the upper end of each chamber $K^5$ is open, in the construction shown, to a chamber $K^6$ which is in free communication with the atmosphere through a port or ports $K^7$. Each valve disc $K^3$ is urged towards its seat by a corresponding spring $K^8$, the upper end of which is engaged by a follower $K^9$ common to all the springs. The follower $K^9$ may be raised or lowered to thereby simultaneously vary the tension of all the springs $K^8$ by the rotation of a hand-wheel $K^{10}$ which has a nut and screw connection with the crosshead or spring follower $K^9$. $K^{12}$ represents a post in sliding engagement with the spring follower $K^9$ to prevent rotation of the latter.

In the construction illustrated the removal of air which tends to collect in the lower portion of the steam and water space of the heater tank is brought about by means of a small bleeder pipe system L which connects an air discharge port $A^6$ in the wall of the heater tank to a port $K^{11}$ opening into the chamber K' of the valve K, or rather, as shown, into the outlet port from that chamber.

In the preferred mode of using my improved water heater in a marine power plant illustrated in Fig. 2 the heater tank is located on a deck of the vessel above the turbine M and main condenser O. The water to be heated by the tank A is drawn from the condenser hot-well by the hot-well pump P and passes from the hot-well pump to the water inlet $A^3$ of the heater through the pipe Q, which, as shown, comprises a seal loop Q' adjacent the heater. The heated water is withdrawn from the tank A by the boiler feed pump R which has its suction pipe T connected to the heater outlet $A^4$. The operation of the boiler feed pump is automatically controlled by the float I through the lever arm I', and rod $I^2$ which is connected to the stem of the regulating valve S' in the steam supply pipe S for the boiler feed pump R. The steam for heating the water admitted to the tank A is supplied by the auxiliary exhaust line U into which the exhaust pipes U' from the hot-well pump P, and $U^2$ from the boiler feed pump R, are shown as connected. It will be understood that the auxiliary exhaust line will ordinarily in practice receive the exhaust steam from various other steam auxiliaries. Water of condensation from steam pipes, heating coils, etc., may be passed into the heater through the inlet $A^7$. In general such returns require little, if any, heating to raise them to the temperature of the heater. The outlet port from the chamber K' of the valve K is shown as connected by the pipe W, and the valved branches W' and $W^2$ thereof to an intermediate stage of the turbine M and to the main condenser O.

In operation, the water to be heated enters the water inlet chamber $A^{30}$ at the top of the tank A and passes from the latter into the hollow part C of the water distributing device. The water is discharged from the part C in a large number of small streams through the ports $C^2$. These streams for the most part fall on to the upper tray or baffle member D. The water falling on member D escapes from the latter in fine streams, discharged through the orifices $D^2$, or in a film-like overflow at the periphery of the tray. The bulk of the water thus passing away from the tray D falls on to the smaller tray or baffle member E and is discharged from the latter in small streams issuing through the ports $E^2$, and in a film-like peripheral overflow. Eventually all of the water passing through the inlet $A^{30}$, plus the water of condensation formed in the space above the perforated diaphragm H collects on the latter and passes in divided streams through the ports H' into the portion of the steam and water space below the partition H. The arrangements described insure the fine subdivision of the water to be heated and its slow passage downward from the water inlet chamber $A^{30}$ to the pool of water in the lower end of the tank which is required to insure the heating up of the water to a temperature but little, if any, below that of the steam entering the heater through the steam inlet port A', with the consequent condensation of a corresponding amount of this steam.

The effectiveness of the water distributing device formed by the parts C, D and E is not materially affected by the rocking movements imparted to the heater tank as the vessel in which it is mounted pitches and rolls, for with the construction described this water spreader is suspended through a universal joint and automatically adjusts itself as required to maintain the general horizontal disposition of the parts D and E as shown in Fig. 3. The suspended water spreader forms in effect a pendulum having a frequency of vibration much higher than the normal pitching and rolling movements of the ship, so that there is no tendency to a resonance oscillating effect. The frictional resistance to the oscillation of the water spreading device with a suspension of the general character shown tends to prevent and quickly damps out pendulum oscillations of the water spreader of any magnitude relative to the vertical. The use of an upper baffle D larger than the lower baffle E permits of a greater oscillation of the water spreader relative to the heater than would be possible if the two baffles were of the same size.

The well known special advantages of an open feed water heater as compared with a closed water heater, such as its high efficiency, the elimination of air from the water being heated by showering it through steam, and the small back pressure on the auxiliaries required to permit the water to be heated as high as is desirable by the exhaust from such auxiliaries, are obviously of particular importance in a marine power plant in which they may be secured by the use of my improved heater.

When steam is supplied to the heater in excess of the amount required to properly heat the water then being fed into the heater, the excess steam is discharged by the valve K and is passed by the latter through the piping W, W' to the turbine M, where a portion of its energy may be utilized or it may be passed directly to the condenser through the pipe W². The difference between the pressure maintained within the heating tank proper, and within the valve chamber K' may be adjusted as and when this is desirable, by varying the tension of the springs K⁸.

While in accordance with the provisions of the statutes I have illustrated and described the best form of my invention now known to me those skilled in the art will understand that many changes may be made in the form of apparatus disclosed without departing from the spirit of the invention as hereinafter claimed, and that certain features of my invention may sometimes be used to advantage without a corresponding use of other features.

Having now described my invention, what I claim as new and desire to secure by Letters Patent, is:—

1. An open water heater comprising in combination a tank with steam and water inlets thereto and a water spreading device adjustably mounted within said tank, and including provisions for automatically adjusting said device when the tank is rocked.

2. In an open feed water heater the combination with a heater tank having steam and water inlets, of a water spreading device pivotally mounted within said tank in position to receive and spread the water entering the heater through the water inlet.

3. In an open feed water heater the combination with a heater tank having steam and water inlets of a device, pivotally mounted in said tank with freedom to swing about an axis located above its center of gravity, for spreading the water entering the tank through said water inlet.

4. An open feed water heater comprising in combination a heater tank having steam and water inlets and a device for spreading the water entering the tank through said water inlet pivotally mounted connected to said tank by a universal joint the center of which is located above the center of gravity of said device.

5. An open water heater comprising a housing formed with a water inlet chamber and with an enclosed steam and water space beneath said chamber and communicating with the latter through an aperture in the bottom wall of said chamber, said bottom wall having an internal concave surface at the margin of said aperture, and a water spreading device comprising a tubular portion passing through but not filling said aperture, and provided with an enlarged head engaging said concave surface whereby said water spreading device is suspended with freedom for adjustment to compensate for rocking movements of the housing.

6. An open water heater comprising a housing formed with a water inlet chamber and with an enclosed steam and water space beneath said inlet chamber and communicating with the latter through an aperture in the bottom wall of said chamber and a water spreading device comprising a tubular portion passing through said aperture and connected within said inlet chamber to the tank by a ball and socket joint.

7. An open water heater comprising a shell or housing enclosing a steam and water space and having steam and water inlets to said space and a water spreading device mounted in said housing and connected thereto by a universal joint to permit the device to turn about a center located above the center of gravity of the device, when said housing is rocked.

8. An open water heater comprising a housing formed with a water inlet chamber and with an enclosed steam and water space beneath said chamber and communicating with the latter through an aperture in the bottom wall of said chamber, and a water spreading device comprising a tubular portion passing through said aperture and lower water spreading baffles, said water spreading device being suspended with freedom for adjustment to compensate for rocking movements of the housing.

9. In an open feed water heater the combination with a heater tank having steam and water inlets, of a device for spreading the water entering the tank through said water inlet, said device comprising baffle members and a central weight, and being pivotally mounted in said tank with freedom to swing about an axis located above its centre of gravity.

AXEL B. WALLEM.